June 18, 1963 V. H. SIEGEL 3,094,663

MICROWAVE SIGNAL CHECKER FOR CONTINUOUS WAVE RADIATIONS

Filed Aug. 3, 1962 5 Sheets-Sheet 1

INVENTOR
VERNON H. SIEGEL

BY

LeBlanc and Shur
ATTORNEYS

June 18, 1963 V. H. SIEGEL 3,094,663

MICROWAVE SIGNAL CHECKER FOR CONTINUOUS WAVE RADIATIONS

Filed Aug. 3, 1962 5 Sheets-Sheet 2

INVENTOR.
VERNON H. SIEGEL

BY

LeBlanc and Shur
ATTORNEYS

INVENTOR
VERNON H. SIEGEL
BY
LeBlanc and Shur
ATTORNEYS

INVENTOR
VERNON H. SIEGEL
BY
LeBlanc and Shur
ATTORNEYS

INVENTOR
VERNON H. SIEGEL
BY
LeBlanc and Shur
ATTORNEYS 3,094,663
MICROWAVE SIGNAL CHECKER FOR CONTINUOUS WAVE RADIATIONS Vernon H. Siegel, Snyder, N.Y., assignor to Radatron Research & Development Corp., North Tonawanda, N.Y., a corporation of New York Filed Aug. 3, 1962, Ser. No. 214,724
31 Claims. (Cl. 325—364)

The present invention relates to improved apparatuses adapted to check operation of a source of microwave signals, particularly of the unmodulated type; and more especially is concerned with an apparatus of the type described employing an improved input circuit comprising a novel arrangement of modulator and detector diodes associated with an antenna, and so disposed electrically and mechanically as to provide a signal checker having greater sensitivity in a smaller and less costly device than has been possible heretofore.

Various arrangements have been suggested heretofore for detecting the presence of continuous wave signals (CW), and for providing an output indication when such a signal has been intercepted. Over the years, CW receivers have been employed, for example, in conjunction with CW telegraphy applications. In general, however, receivers of the types suggested heretofore have been relatively complex and costly. In recent times, frequencies of CW transmissions have become higher and higher, extending at the present time into frequencies characterized by transmissions of centimeter wavelength; and at such higher frequencies, sometimes termed "microwave" frequencies, the receivers used for reception of microwave CW have become even more complex and costly than was the case in telegraphy applications.

This development in the art of CW receivers has prevented known such receivers from being widely employed as checking devices, notwithstanding the real need for such checking devices. By way of example, in various traffic installations, automatic signal light changing devices operating on radar principles have found increasing favor. These signal changing devices, disposed for example adjacent feeder roads leading into a throughway or main highway, ordinarily comprise a radar transmitter projecting beamed energy at microwave frequencies across the feeder road. The device also includes a receiver and control circuits adapted to respond to echo signals produced by a vehicle intercepting such beamed energy as it passes along the feeder road toward the throughway, to effect changing of the traffic light after a predetermined delay. Service personnel must check the proper operation of such radar operated signal light changes at periodic intervals; and heretofore, the normal checking operation required, among other things, that various components and/or tubes in the radar apparatus be physically removed therefrom for checking with suitable instruments, because a more convenient method of checking was not previously available. Theoretically, proper operation of such radar signal light changers could be determined by use of some prior known microwave CW receiver, but the characteristics of known prior available microwave receivers are such that they could not be conveniently or economically employed as a mere piece of check equipment in a road service vehicle, whereby the more laborious aforementioned physical checking procedures have been used.

The advantage of a small microwave signal checker installed in an automobile, whereby highway service personnel can check the radar signal changer simply by driving the vehicle into proximity to the traffic signal and its radar beam, is self apparent. Furthermore, motorists having such a device on their cars can similarly be assured that the signal changing device is operating properly, so they could know that a signal light will change in short course to permit their continued travel, or is definitely out of order whereby the light will not change.

There are also other advantageous uses for a compact, efficient, low-cost microwave signal checker. Other types of equipment radiating high frequency energy, such as radar transmitters, diathermy machines, and the like, can be checked for proper operation, on location and without dismantling the equipment, through the simple expedient of using a checker of the type here contemplated in proximity to the source of radiation.

The checkers of the present invention are also useful as driver alarms to warn motorists that they are approaching danger zones such as blind crossings, bad curves, intersections, traffic accident or road repair areas and even school zones. They have also been found useful for detecting dangerous high energy radiation leakage from radar installations. A further important use of the checkers of the present invention involves military applications such as the detection of enemy surveillance radar and as a warning device in aircraft for avoiding midair collisions in both military and civilian flying.

The present invention, recognizing these possible uses for a microwave source checker, and further recognizing that prior available CW receivers are of such size, cost, and complexity as to prevent their efficient and economical use in mere checking operations, is primarily concerned with a highly simplified, compact receiver and circuit adapted to be employed in detecting the presence of radiations emanating from a microwave source, and their magnitude if desired. To achieve these results and simplifications, the receiver of microwave checker of the present invention is especially concerned with a novel mechanical and electrical arrangement for an input circuit comprising a portion of the improved compact receiver.

It is accordingly an object of the present invention to provide a new improved apparatus adapted to be employed in detecting the presence and magnitude of radiation, particularly in the microwave range. It is a related object of the present invention to provide an electromagnetic radiation detector which is smaller, simpler in construction and less costly to provide and maintain than has been possible heretofore. Another related object of the present invention is the provision of a highly portable, small, lightweight, and rugged radiation detector, adapted to check proper operation of apparatuses radiating energy in the microwave range, on location, and without requiring disassembly of such radiating apparatuses.

Another object of the present invention resides in the provision of an improved radiation detector circuit adapted to respond to a received CW signal, and adapted to give an audible or other output indication. Another related object of the present invention resides in the provision of an improved radiation detector or receiver input circuit providing modulation and demodulation of received radiation with good sensitivity, and less attenuation than has been possible heretofore. Still another related object of this invention resides in the provision of a novel modulator and demodulator circuit adapted to convert received CW, particularly in the microwave range, into an audible or other output indication.

Another object of the present invention resides in the provision of a receiving antenna and an improved input circuit comprising a pair of diodes associated in a novel mechanical configuration with respect to said antenna, to provide not only signal rectification but also capacitive and other impedance components forming a portion of the input circuit.

Another object of the present invention is to provide a microwave detector capable of detecting signals at two different frequencies.

Another object of the present invention is to provide a microwave detector capable of detecting ether continuous or modulated energy.

Another object of the present invention is to provide a regenerative detector utilizing a local oscillator widely differing in frequency from that of the detected signal.

Another object of the invention is to provide a microwave detector capable of receiving signals in two different frequency bands.

Another object is to provide a novel counter detection system for microwave signal checkers.

To attain the foregoing objects and advantages, the present invention contemplates the provision of a radiation detector comprising an antenna associated with a pair of crystal rectifiers having like terminals, e.g., their cathodes, connected to opposed sides of the antenna. The said crystal rectifiers are adapted to operate respectively as a modulator (or switch) and as a detector; and the physical disposition of these two rectifiers is such that a capacitance is produced between their spaced ends (e.g., the anode ends of said rectifiers), whereby said rectifiers antenna, and capacitance form a closed loop input circuit adpted to produce a circulating current in response to reception of CW.

A source of modulating energy, which may take the form of a transistorized multivibrator operating at an audio frequency rate, is provided in the microwave signal checker; and this source of local oscillations has its output coupled to the rectifier acting as the aforementioned modulator, to chop the circulating CW at an audio rate. This chopped CW is detected by the other diode, acting as a demodulator; and the operation of the circuit is such that a low frequency alternating voltage is produced across the aforementioned capacitance defined between the anode ends of the two diodes. This low frequency alternating current is then amplified and used to drive a speaker, an output meter, or any other desired form of output indicator (e.g., a light), thereby providing a visual and/or audible output in response to reception of CW signals.

The entire circuit is transistorized, whereby it may be packaged in an extremely compact unit. The compactness and simplicity of the design is moreover considerably enhanced by the aforementioned input circuit comprising the modulator and detector diodes, associated with the signal checker antenna and with each other, to provide a capacitance across which low frequency signals are developed when CW is received. As a result of this arrangement, the signal checker units are small, rugged, relatively free of maintenance problems, and can be produced at relatively little expense.

The foregoing objects, advantages, construction and operation of the present invention will become more readily apparent from the following description with reference to the accompanying drawings, in which.

Figure 1:
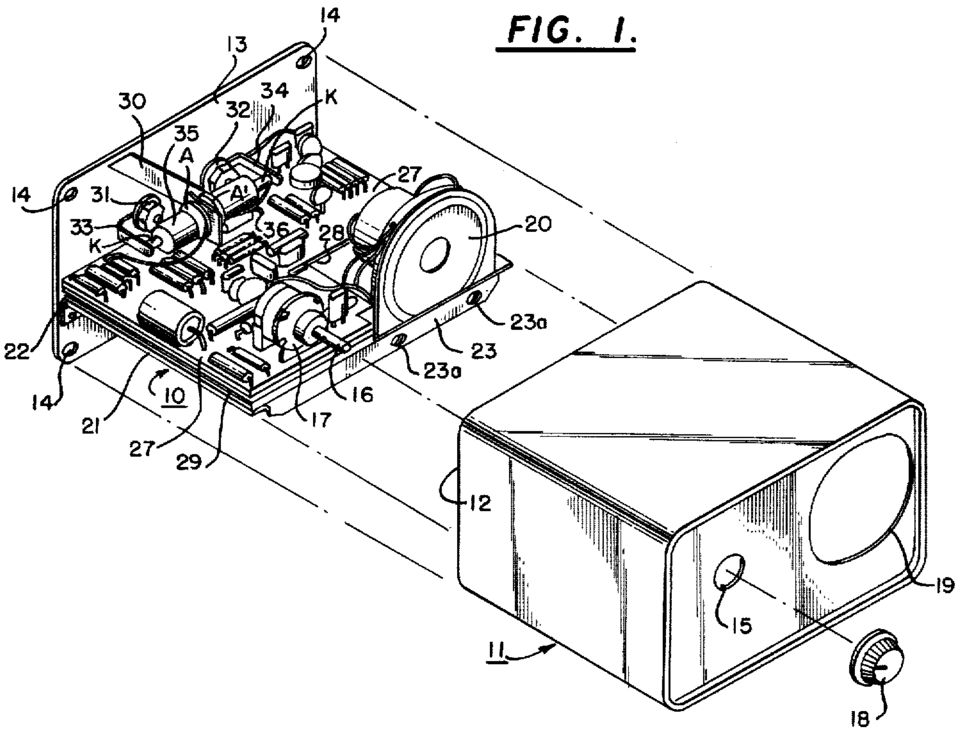
FIGURE 1 is an exploded perspective view of a radiation detector constructed in accordance with the present invention.
Figure 2:
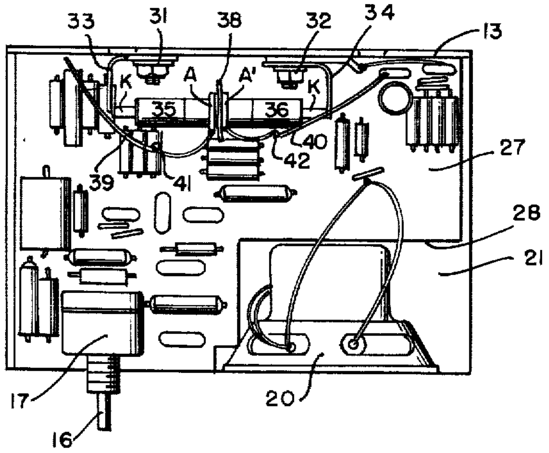
FIGURE 2 is a top view of the chassis portion of the unit shown in FIGURE 1.

Referring to the drawings, FIGURES 1 and 2 show a unit comprising a chassis generally indicated at 10 adapted to be mounted within a housing generally designated 11. Housing 11 is of relatively small size, e.g., substantially 4" wide, 3" deep, and 2" high and it has an open end 12 into which the chassis unit 10 may be inserted. Chassis unit 10 in turn includes a plate 13 provided with apertures 14 adapted to receive screws for securing the plate 13 and the remainder of chassis 10 within the housing 11. Housing 11 further includes an aperture 15 in its front face adapted to receive the shaft 16 of a potentiometer 17 carried by the chassis unit 10, and adjustment knob 18 may be fixed on the shaft 16 by an appropriate set screw.

In addition, the front face of housing 11 includes a further aperture 19 adapted to be associated with an output indicator 20 such as a speaker carried on chassis 10. When the output indicator takes the form of a meter the meter face is disposed within the confines of aperture 19. In the alternative, aperture 19 may be formed with a grill surface when the output indicator 20 takes the form of a speaker, this latter type of indicator comprising the particular embodiment illustrated in FIGURES 1 and 2. When the output indicator takes the form of a light it can be mounted directly on the front face of the housing 11. Suitable modification of housing 19 for different types of signal output indicators is readily apparent.

Chassis 10, in addition to being provided with a rear plate 13, includes a main base or supporting plate 21 extending transverse to plate 13 and provided with a pair of downwardly extending lugs, one of which is illustrated at 22, whereby said supporting plate 21 is attached to the rear plate 13 by appropriate fastening means such as rivets. Transverse plate 21 is further provided at its forward edge with a downwardly extending flange 23 on which is mounted the output indicator such as speaker 20, by means such as screws **23*a*. The under surface of the base plate 21** is provided with a suitable mounting arrangement for an energy source such as a pair of mercury cells.

A printed circuit board 27 is disposed adjacent the upper surface of transverse supporting plate 21, said printed circuit board 27 having conductive deposits on the under surface thereof forming portions of the circuits to be described hereinafter. Circuit board 27 is further provided with a cut-out 28 to provide space for output indicator 20. In addition, a thin sheet of insulating material 29 is disposed between printed circuit board 27 and metal supporting plate 21 to prevent shorting of the several conductive deposits carried by the underside of circuit board 27, through the plate 21.

The surface of printed circuit board 27 is provided with a plurality of punchings designed to receive lead wires from various components comprising the circuits to be described hereafter, these components including transistors, resistors, capacitors and inductances. A typical representation of the components is shown in physical form in FIGURES 1 and 2. Since the components in themselves are conventional no specific numerals have been given to the various components. It is understood that the physical circuit layout of FIGURES 1 and 2 may be representative of any one of the detailed circuits to be described.

Conductive rear plate 13 of the chassis 10 has formed therein an elongated diagonally disposed slot 30, generally of parallelogram form, to act as a slot antenna by intercepting microwave energy incident on rear plate 13. The description of the invention herein is directed to embodiments with a slot antenna of the general type illustrated in FIGURE 1, since that is a highly economical and efficient antenna in the environment here involved. However, it is to be understood that other types of antennas can also be used with the signal detector of the present invention including di-poles, loops, stubs, helix antennas and the like. Furthermore, the detector is usable in conjunction with both coaxial wire and wave guide inputs. It should be pointed out, however, that if due to the particular antenna or other input chosen, there is no D.C. continuity or path between opposite sides of the input, a choke should be provided to effect such a D.C. continuity. This is not required in the case of the slot antenna 30 inasmuch as such continuity is provided by adjacent portions of the conductive plate 13.

In the embodiment shown, a pair of generally L-shaped conductive straps 33 and 34 are secured to plate 13 in positions closely adjacent opposite sides of slot 30 by a pair of mounting screws 31 and 32 with the legs of straps 33 and 34 extending inwardly of rear plate 13 on opposite sides of slot antenna 30. The size and length of straps 33 and 34 are selected so as to provide an appropriate series inductance (when associated with the shunt capacitance of the microwave diodes hereinafter described) to provide an impedance match between the input circuit of the detector and the source impedance of the slot antenna 30.

The above mentioned microwave diodes are designated 35 and 36, and each of such diodes comprises a semiconductor device such as the type currently designated 1N23B. The cathode ends of the two diodes 35 and 36 designated K, are attached to the outer extremities of straps 33 and 34 by appropriate means such as solder. The two diodes 35 and 36 are disposed in generally co-linear relation to one another and generally parallel to the plane of rear plate 13, with their respective anode ends designated A and A′ being in close proximity but physically spaced from one another opposite a portion of slot antenna 30. By reason of this physical spacing between the anode ends of the two microwave diodes 36 and 35 a capacitance 37 (see FIGURE 3) is formed therebetween, said capacitance having a relatively low impedance at microwave frequencies due to the physical spacing actually selected. Capacitance 37 has an essentially air dielectric, however, in order to inhibit breakdown of the capacitance due to shorting of the two anode ends to one another and also in order to modify the size of the capacitance as may be desired, a dielectric material such as a tab 38 of plastic may be interposed between the anode ends A and A′ of diodes 35 and 36. To facilitate this, plastic tab 38 may be secured by an appropriate adhesive to one or both of the anode ends A and A′.

Moreover, it is noted that the two diodes 35 and 36 need not be disposed in essentially a co-linear relation to one another and generally parallel to the rear plate 13 in all instances, providing that the diodes are otherwise arranged consistent with the disclosure herein.

As more fully explained hereafter, the anode ends A and A′ of the microwave diodes 35 and 36 are connected with inductances to provide a frequency selective or responsive circuit that is adapted to permit relatively low frequencies to be transmitted to amplifying portions of the detector, while simultaneously inhibiting transfer of higher frequencies such as the microwave frequencies being checked. At microwave frequencies these inductances may be formed by wire leads 39 and 40 provided if desired with suitable inductive kinks 41 and 42.

Figure 3:
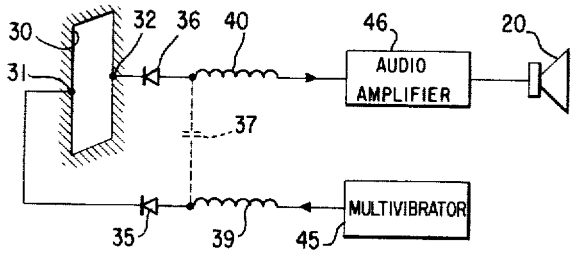
FIGURE 3 is a schematic diagram of the circuit shown in physical form in FIGURES 1 and 2.

The physical disposition of components shown and described in reference to FIGURES 1 and 2 forms an extremely simple input circuit comprising in essence a pair of diodes which act as a modulator and detector respectively and due to their physical disposition simultaneously provide a capacitance forming a portion of the input circuit illustrated in FIGURE 3. For convenience in relating the circuit of FIGURE 3 to the physical embodiment of FIGURES 1 and 2, like parts bear like reference numerals in the respective figures.

Referring now to FIGURE 3 the arrangement is such that the two diodes 35 and 36 have their cathode ends respectively connected to opposite sides of slot antenna 30 at 31 and 32 with their anode ends inter-connected to one another via distributed capacitance 37. As more fully explained hereafter, diode 35 acts as a chopper or modulator, and modulating energy derived from the remainder of the detector is coupled by way of choke-coil inductance 39 to diode 35. Inductance 39 provides a sufficiently low impedance to permit this coupling of the relatively low frequency local energy, but a sufficiently high impedance to prevent the transfer of received microwave energy to the source of local oscillations. Diode 36 acts as a detector or demodulator ultimately operative to produce relatively low frequency alternating voltages across capacitor 37, and these voltages are coupled therefrom to the remainder of the system via similar choke inductance 40. As was the case with inductance 39, inductance 40 provides a sufficiently high impedance at microwave frequencies to prevent transfer of the high frequency signals to the remainder of the circuit.

In FIGURE 3 the detected signals from diode 36 pass through inductance 40 to a conventional capacitance coupled audio amplifier 46 and on to speaker 20. Oscillator 45, preferably in the form of a conventional multivibrator, supplies local oscillations of audio frequency to diode 35 through choke coil 39.

The operation of the system of FIGURES 1–3 is such that, absent incident microwave or CW radiation on slot antenna 30, no signal will be coupled via choke 40 to amplifier 46, and no output indication will be produced by speaker 20 (or whatever other output indicator, e.g., a meter, is employed). When electromagnetic radiation is incident on the slot antenna, however, it tends to produce a current circulating between opposite sides of slot antenna 30 via diodes 35 and 36, and capacitance 37; and this circulating current is caused to be interrupted or chopped at the output rate of multivibrator 45.

In particular, diode 35, acting as a chopper or modulator, is rendered conductive by alternate half cycles of the output signal produced by multivibrator 45. When electromagnetic radiation is incident on slot antenna 30 and diode 35 is rendered conductive by an output from multivibrator 45, diode 35 becomes a low impedance path from terminal 31 to capacitor 37. High frequency alternating voltages appearing at terminal 31 then pass through diode 35 to capacitor 37, but do not flow through choke or inductance 39 due to the high impedance offered by said inductance 39 to microwave frequencies. The other phase of the high frequency alternating current incident on slot antenna 30 passes from terminal 32 through diode 36 to the other side of capacitor 37; but again the microwave frequencies do not pass through choke 40 due to the high impedance thereof at said microwave frequencies.

By this action, a D.C. voltage is developed across capacitor 37, due to the rectifying properties of detector diode 36, so long as switch or modulator diode 35 is conductive.

When modulator diode 35 is cut off by the next half cycle of multivibrator 45 output, high frequency alternating voltages appearing at terminal 31 are preventing from being coupled through diode 35 to capacitor 37; and this in turn prevents diode 36 from detecting said high frequency alternating voltage. By this arrangement, therefore, high frequency energy incident on slot antenna 30 is alternately interrupted and connected to capacitor 37, at a chopping rate corresponding to the output frequency of multivibrator 45, whereby a relatively low frequency alternating voltage is produced across capacitor 37 (said capacitor 37 having a relatively high impedance at the output frequency of multivibrator 45).

It should be noted that, by the operation described, current flows through diodes 35 and 36, and a voltage is developed across capacitor 37, only when CW or microwave energy is incident on antenna 30. Accordingly, no output is achieved until such energy is received. Moreover, it should be noted that, when microwave energy is received and current is caused to flow, the current thus flowing circulates in a closed loop between opposite sides of antenna 30 and via diodes 36–6 and capacitance 37, being impeded from flowing to remaining portions of the circuit by chokes 39 and 40. This in turn assures that the RF or received microwave energy is confined to the input circuit described, whereby it experiences substantially no attenuation due to resistive elements present in other input circuits heretofore suggested. Accordingly, the input circuit of the present invention, notwithstanding its economy and simplicity, approaches the sensitivity and performance offered by far more elaborate wave guide and coaxial arrangements normally utilized in microwave installations.

The relatively low frequency alternating voltage appearing across capacitor 37, due to the modulating and detecting action of diodes 35 and 36, is coupled via choke 40 to amplifier circuit 46 to provide an audible or visual output in response to radiation incident on slot antenna 30. The DC continuity across the antenna provides a discharge path for capacitance 37 so that the voltage across the capacitance follows the envelope of the detected signal. In use, the assembled radiation detector unit can be mounted or otherwise positioned so that the slot 30 in the rear face thereof faces the source of radiation to be checked or detected. When the source being checked is radiating, a visual or audible output will immediately be produced at output indicator 20.

Figure 4:
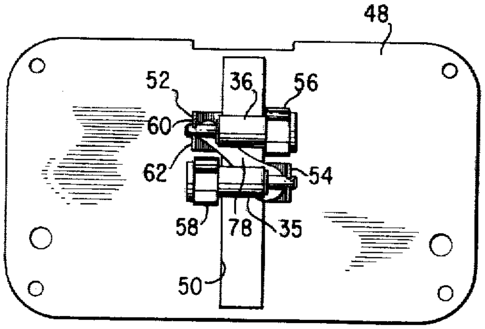
FIGURES 4 and 5 are front and rear views respectively of a modified antenna plate and input circuit for the checker of the present invention.
Figure 5:
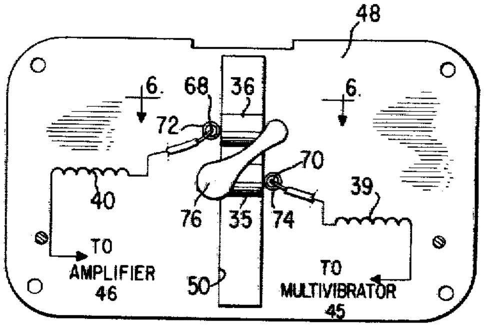
Figure 6:
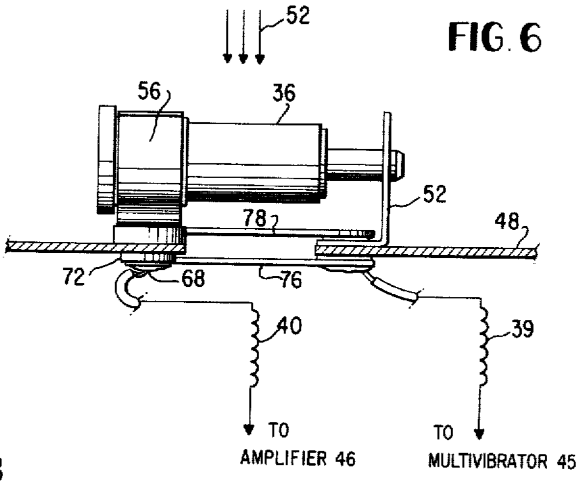
FIGURE 6 is a horizontal sectional view taken along line 6—6 of FIGURE 5.
Figure 7:
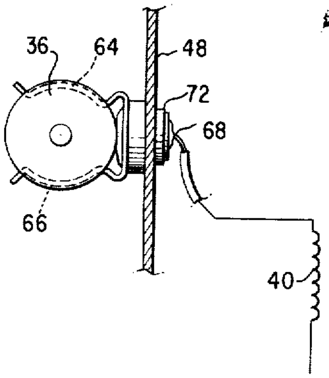
FIGURE 7 is a partial side view of the antenna plate of FIGURES 4–6.
Figures 8, 9:
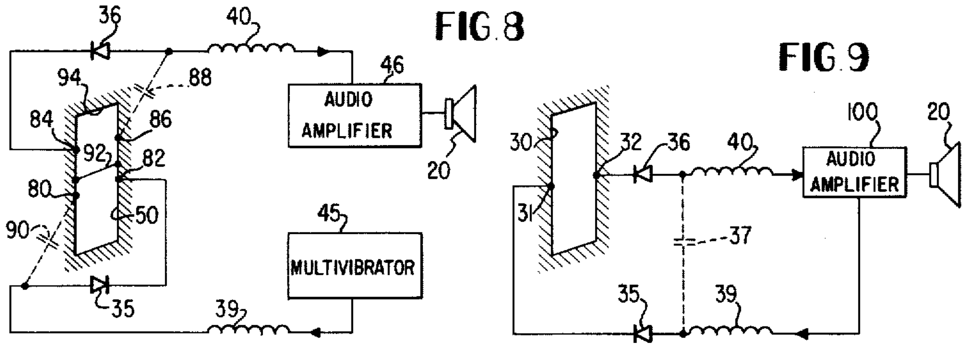
FIGURE 8 is a schematic diagram of the microwave checker of the present invention embodying the modified antenna plate and input circuit of FIGURES 4–7 capable of receiving signals at two different frequencies.
FIGURE 9 is a schematic diagram of a further embodiment of the present invention which employs regeneration to eliminate the need for a separate local oscillator.

FIGURES 4–8 illustrate a modified signal checker constructed in accordance with the present invention capable of receiving signals in two different frequency bands. FIGURE 4 is a front view of a modified antenna plate and FIGURE 5 is a rear view of the same plate. FIGURE 6 is a vertical cross section taken along line 6—6 of FIGURE 5 and FIGURE 7 is a partial side view of the plates of FIGURES 4–6 illustrating the mounting of one of the diodes. FIGURE 8 is a simplified circuit diagram incorporating the mounting plate of FIGURES 4–7. In the modified embodiment, like parts are indicated by like numbers.

In FIGURES 4 and 5 the antenna plate 48 is provided with a vertical slot 50 generally corresponding to the diagonal slot 30 of FIGURES 1–3. Diodes 35 and 36 are mounted on the front face of plate 48 on the side which receives incident microwave energy as indicated by the arrows 52 in FIGURE 6. Each of the diodes is mounted by means of a cathode bracket 52 and 54 and anode brackets 56 and 58 which are secured to the antenna plate 48. Each of the cathode brackets is of similar L-shaped construction as best seen in FIGURE 6 and includes a pair of upwardly extending spaced fingers 60 and 62 resiliently receiving therebetween the cathode terminal of each of the diodes. The lower legs of the cathode brackets 52 and 54 are soldered or otherwise suitably secured to the plate 48.

Anode brackets 56 and 58 are formed with a pair of upwardly curved integral extensions forming fingers 64 and 66 resiliently engaging the anodes of each of the diodes 35 and 36. The anode brackets 56 and 58 are secured to plate 48 by means of rivets such as 68 passing through suitable aperatures in the plate. Surrounding the rivets 68 and 70 are insulating bushings 72 and 74 formed of suitable dielectric material to prevent shorting of the diode anode terminals to the plate 48. Each of the rivets 68 and 70 is connected by a lead to the corresponding RF choke coil 40 or 39. Also secured by soldering or the like to opposite surfaces of antenna plate 48 are a pair of shorting bars 76 and 78 extending diagonally across the slot 50.

Referring to FIGURE 8, diode 35 is connected across the slot 50 between terminals 80 and 82 and diode 36 is connected across the slot between terminals 84 and 86. Insulating bushing 72 in FIGURE 5 forms a distributed capacitance 88 between the anode of diode 36 and terminal 86 at the edge of slot 50. Insulating bushing 74 similarly forms a distributed capacitance 90 between the anode of diode 35 and terminal 80 on the other edge of slot 50. The two shorting bars 76 and 78 are represented by the single shorting conductor 92 in FIGURE 8.

The signal checker of FIGURE 8 is capable of detecting signals from two different frequency bands such as the lower S band and the higher X band. At the lower of the two frequencies (to which lower frequency the slot 50 is tuned) diode 36 receives RF energy incident on the slot 50. Diode 35 is alternately energized and de-energized by multivibrator 45. When diode 35 is energized the electrical characteristics of the slot antenna are altered such that some of the energy across the slot antenna passes through diode 35 thereby altering the signal available at diode 36. This is accomplished since diode 36 is located on the slot antenna where the voltage across the slot antenna is other than zero and diode 35 is preferably located somewhere near voltage maximum, i.e., ideally midway between the ends of the slot. Slot antenna 50 is preferably an integral number of half wave lengths and if as preferred the length of the slot is a half wave length long at the lower frequency then the center of the slot has a voltage maximum.

For the higher of the two frequency bands diode 35 is located a distance from the upper edge 94 of the slot such that when diode 35 is energized by the multivibrator a different length of slot is produced. If energy of the higher frequency band is now received, the voltage of diode 36 is higher when diode 35 is energized than it is when diode 35 is unenergized. With this higher frequency such that the length from upper edge 94 of the slot to diode 35 is approximately one-half wave length or an integral number of half wave lengths then the voltage at diode 36 is a maximum when diode 35 is energized.

Since the diodes have some series inductance and shunt capacitance the position of diode 35 from upper edge 94 will not ordinarily be exactly at an integral number of half wave lengths.

In operation, in the absence of electromagnetic radiation no voltage appears between points 84 and 86 of the antenna and no signal appears across distributed capacitance 88. However, if radiation at the lower frequency to which the slot is resonant is present across points 84 and 86, diode 36 rectifies the voltage and a D.C. voltage appears across capacitance 88. This D.C. voltage does not pass through amplifier 46 to produce an audio output at speaker 20.

When the voltage at the output of multivibrator 45 goes positive a current flows through choke 39 and through diode 35 to the antenna plate which is at ground potential. As the diode 35 conducts it allows RF energy to flow from terminal 82 to terminal 80 on antenna 50. No high frequency energy flows into the multivibrator 45 because of the choke coil 39. When energy flows from terminal 82 to terminal 80 the voltage from terminal 84 to terminal 86 is decreased since the frequency of radiation is such that a voltage maximum occurs along the slot antenna near the terminals 80 and 82.

The periodic conduction of diode 35 acts to periodically produce a short between terminals 82 and 80 as the multivibrator 45 drives current through the choke coil 39 and the diode 35. This short is effective to mismatch antenna 50 to the frequency at which the slot is tuned during the time diode 35 is conducting, but allows antenna 50 to be resonant during the off cycle of diode 35. During this off cycle more energy passes from terminal 86 to terminal 84 through diode 36 and the distributed capacitance 88.

When the second higher frequency is incident on antenna 50 (which preferably is a frequency different from an exact multiple of the previously described lower frequency) and with the diode 35 turned off the antenna 50 will not be resonant and the voltage appearing across terminals 86 and 84 is not a maximum. However, diode 35 is located on antenna 50 such that when it becomes conductive by means of multivibrator 45 the effective length of the slot from upper edge 94 to terminals 82 and 80 is made to resonant at the second higher frequency and the voltage at terminals 84 and 86 increases. In this way, when diode 35 is made conductive the voltage from 86 to 84 will increase in magnitude and therefore a greater voltage will appear across distributed capacitance 88 than appears when diode 35 is turned off. This alternating increase and decrease of voltage across capacitance 88 is amplified in amplifier 46 and actuates speaker 20.

As mentioned before the effective length of the antenna when diode 35 is conducting will ordinarily be different than the measured distance from upper edge 94 to terminals 82 and 80 since diode 35 has some series inductance and shunt capacity which offers an effective longth to the path of current flowing between terminals 82 and 80. The particular positions of the diodes and the size of the slot all have an effect upon reception and are more critical for the higher of the two frequency bands received. These factors must be determined empirically for the particular frequencies being received, but in general diode 36 is located with respect to the upper edge 94 of the slot in such a position as to get a proper impedance match with the antenna. Diode 35 is located so as to act as a short circuit for the lower frequency and so as to cut the effective length of the slot antenna for the higher frequency. The shorting bars are not essential to the operation and can be omitted but are useful in providing an effective inductance so as to provide a good impedance match for diode 36. By way of example only in one unit constructed for use with S and X band frequencies, the vertical slot 50 had a width of 0.300 inch and a length of 1.950 inches. Diode 35 was placed across the slot 1.000 inch from the bottom edge of the slot and diode 36 was spaced 0.375 inch above diode 35. In the same device the antenna plate had an over-all width of 3⅝ inches, an over-all height of 2³⁄₁₆ inches and was made from 0.040 inch thick stock.

FIGURE 9 shows a simplified circuit diagram of a modified signal checker utilizing regenerative feedback, thus eliminating the need for multivibrator 45. In FIGURE 9 regenerative feedback is taken from a tuned audio amplifier 100 and fed back through choke coil 39 to the modulator diode 35.

Figure 10:
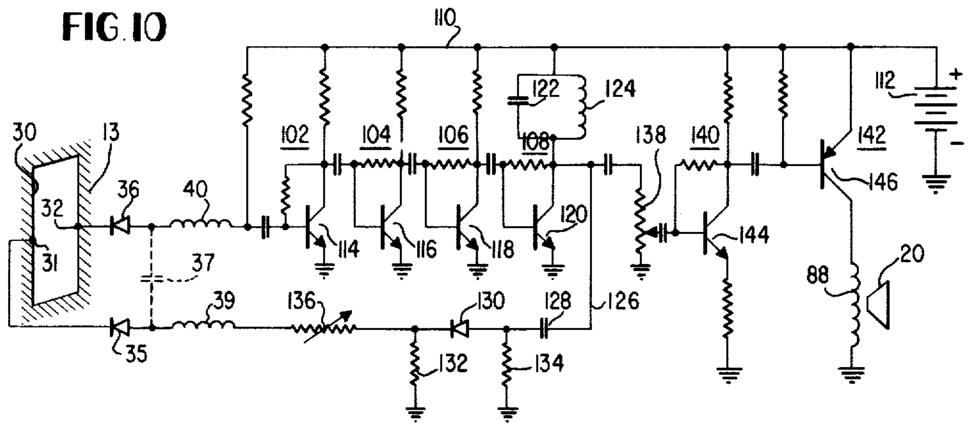
FIGURE 10 is a detailed circuit diagram of the regenerative microwave checker of FIGURE 9.

FIGURE 10 shows a detailed circuit diagram for a regenerative receiver such as that of FIGURE 9. In FIGURE 10 the detected signals from diode 36 pass through inductance 40 to a conventional capacitance coupled audio amplifier comprising transistor stages 102, 104, 106, and 108. Bias for the transistor stages is obtained by way of lead 110 from a suitable source such as represented by battery 112. The transistor stages are in general conventional and comprise capacitively coupled NPN junction transistors 114, 116, 118 and 120, each having a grounded emitter. A frequency sensitive network or tank circuit comprising capacitor 122, and coil 124, is connected in the collector circuit of transistor 120. This frequency sensitive circuit is used to determine the output frequency to speaker 20.

Regenerative feedback from the collector circuit of transistor 120 to diode 35 is accomplished by way of lead 126 through capacitor 128, diode 130, resistors 132 and 134 and variable feedback resistor 136.

A separate audio amplifier section is provided comprising potentiometer 138 and transistor stages 140 and 142 including NPN junction transistor 144 and PNP junction transistor 146, the latter driving the coil 148 of speaker 20.

The operation of the circuit of FIGURE 10 is as follows: In the absence of a high-frequency voltage between points 31 and 32 on the antenna, any voltage that appears on capacitor 37 is due to noise generated in diode 36. This noise is amplified in the audio amplifier stages and is filtered by the frequency sensitive filter composed of capacitor 122 and coil 124. A portion of this amplified noise voltage is applied through feedback diode 130 and feedback resistor 136 to diode 35. If the gain of the amplifier stages 102, 104, 106 and 108 is sufficient to produce enough voltage across resistor 132 to cause diode 35 to conduct, an oscillation may occur excited by noise alone. However, the gain of the audio amplifier stages is preset so as to be insufficient to produce enough voltage across resistor 132 to cause diode 35 to conduct from amplified noise alone and hence, noise alone will not cause the loop to oscillate.

However, when radio frequency voltage appears across terminals 31 and 32, diode 35 is first modulated by noise impulses from the output of the audio amplifier stages. The voltage appearing across capacitance 37 is now of larger amplitude due to the rectified RF or high-frequency voltage. The votlage across capacitance 37 is in turn amplified by audio stages 102, 104, 106 and 108, filtered by the tank circuit 122 and 124 and applied through diode 130 and resistor 136 to modulator diode 35. This build-up in energy causes the loop to oscillate at a frequency near the resonant frequency of the tank circuit 122 and 124. The action of diode 130 and resistor 132 is that of a half-wave rectifier to produce an average voltage other than zero when oscillation occurs. This average voltage acts to further bias diode 35 into higher conduction and insures full amplitude of oscillation.

Figure 11:
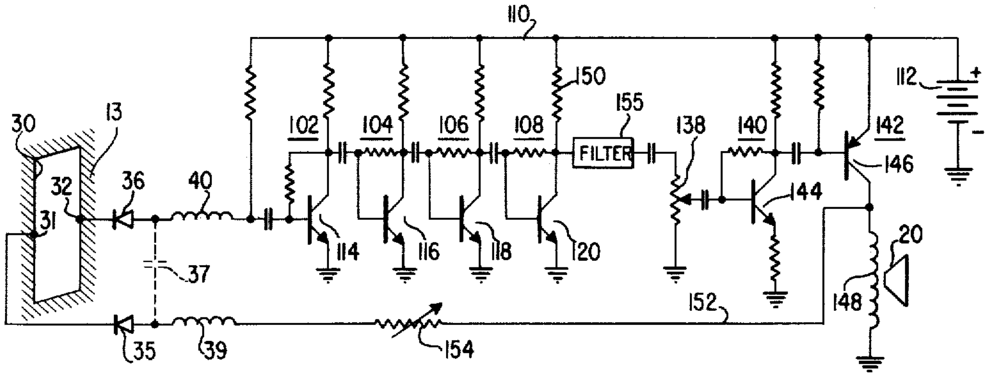
FIGURE 11 is a detailed circuit diagram of a modified regenerative microwave checker constructed in accordance with the embodiment of FIGURE 9.

FIGURE 11 shows a modified circuit in many respects similar to that of FIGURE 10 with like parts again bearing like reference numerals. However, in FIGURE 11 the tank circuit of amplifier stage 108 in the collector circuit of transistor 120 is replaced by a resistor 150. Regenerative feedback is from the coil 148 of the speaker 20 by way of lead 152 through a variable feedback resistor 154 to the diode 35. In the circuit of FIGURE 11 the resonant frequency of the indicating device or speaker 20 is used to determine the loop oscillating frequency. In this case, transistor 146 is normally biased at or near cut-off to act as a half-wave rectifier so that the input to transistor 146 appears across coil 148 as a half-wave rectified signal. Indicating device 20 as in the circuit of FIGURE 10 may be a loud speaker, relay, a meter, or other indicator. The build-up of signals in the circuit of FIGURE 11 is similar to that of the circuit of FIGURE 10 as previously described.

If desired a low-pass filter 155 may be provided in the amplifier chain to produce an amplifier amplitude characteristic such that the amplitude decreases with increasing frequency. The output frequency to the speaker 20 is then dependent on the strength of the radio frequency energy received at antenna 30.

Figures 12, 13, 14:
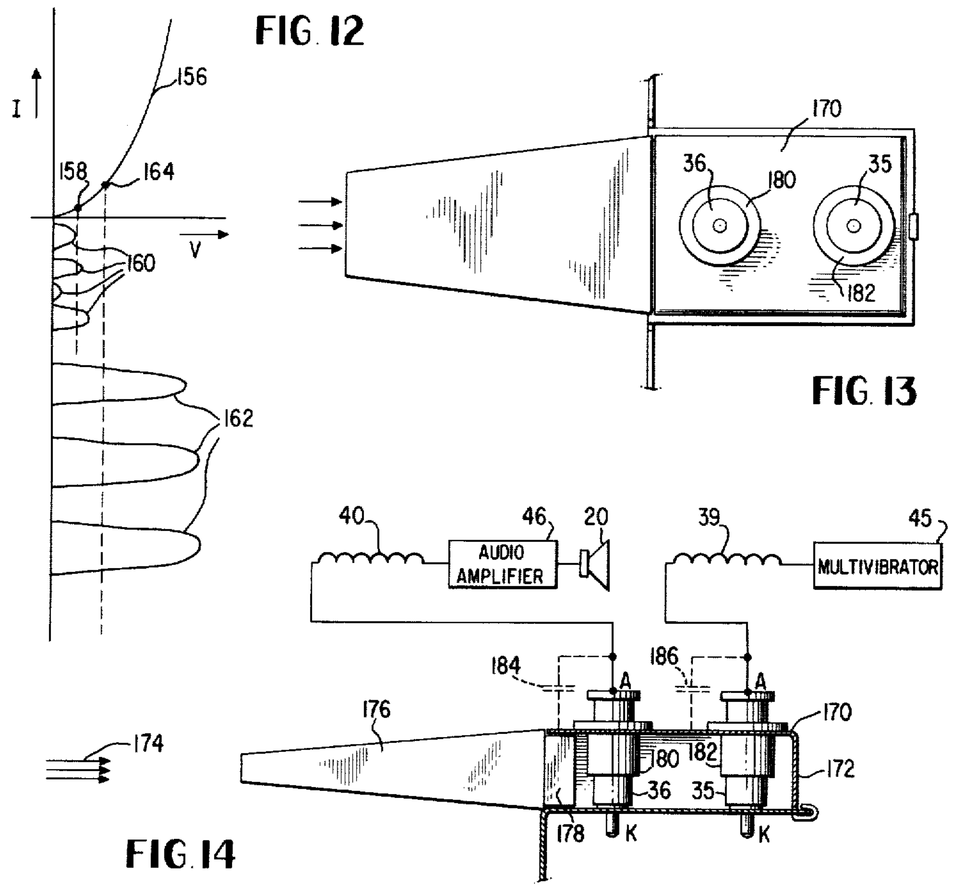
FIGURE 12 shows typical feedback waveforms for for circuits of FIGURES 10 and 11.
FIGURES 13 and 14 are plan and vertical cross sectional views respectively of a further embodiment of the invention.

FIGURE 12 illustrates the "squelch" type action resulting from the half-wave rectified regenerative type feedback provided in the circuits of both FIGURES 10 and 11. In FIGURE 12 the curve 156 represents a typical forward conduction curve for modulating diode 35 with current plotted as a function of voltage. The operating point 158 on curve 156 represents the average value of the noise pulses indicated generally at 160, fed back by way of resistor 136 in FIGURE 10 or resistor 154 in FIGURE 11 to diode 35. When oscillation develops in either of the two circuits as represented by the increased magnitude of the feedback generally indicated at 162 in FIGURE 12 the average voltage is greater and hence the operating point shifts to point 164 on curve 156 resulting in a further biasing of diode 35 to a higher operating point. This results in the "squelch" action described and assures the rapid full amplitude of oscillation.

FIGURES 13 and 14 show a further modified embodiment of the novel microwave checker of the present invention wherein the diodes 35 and 36 are mounted in a wave guide antenna 170. The wave guide is shorted at one end 172 and is terminated at its other end in a suitable microwave collector receiving incident microwave radiation as indicated by the arrows 174 in FIGURE 14. While a horn can be used, in the preferred embodiment the open end of the wave guide is terminated in a tapered dielectric rod 176 made of polystyrene or other suitable material having a reduced portion 178 frictionally receivable in the open end of the wave guide. With this construction the rod 176 can be conveniently removed when the device is not in use.

The cathodes of diodes 35 and 36 labelled K are electrically connected to the wave guide while the anodes labelled A in FIGURE 14 are insulated from the wave guide by dielectric bushings 180 and 182. At microwave frequencies such as X band frequencies for which the device of FIGURES 13 and 14 is most suited, the dielectric bushings and diode spacings result in distributed capacitances 184 and 186 between the anodes of the diodes and the adjacent surfaces of the waveguide.

Figure 14A:
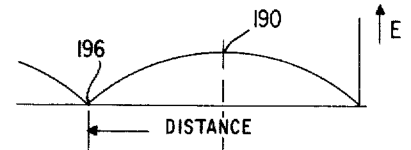
FIGURES 14A and 14B show typical voltage standing wave patterns in the waveguide of FIGURE 14.
Figure 14B:
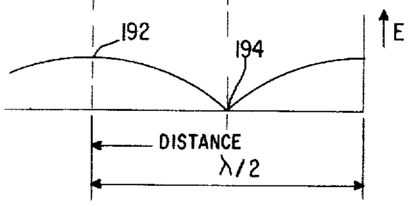

FIGURE 14A shows the voltage standing wave along wave guide 170 when diode 35 is in the off condition while FIGURE 14B shows the voltage standing wave when diode 35 is turned on by the multivibrator 45. When diode 35 is not energized the voltage at diode 35 is a minimum as indicated by the curve at 190 in FIGURE 14A. The short at the end 172 of the wave guide is modified by the reactances of the diodes to give a longer effective electrical length to the waveguide and is repeated back to present a low voltage 196 at diode 36.

When diode 35 is turned on by the multivibrator it ideally looks like a short circuit at point 194 on the voltage curve in FIGURE 14B which causes a shift in the short normally appearing at point 196 in FIGURE 14A such that the voltage now appearing at diode 36 is maximized as indicated at 192. Since the diodes are not perfect but have series resistance, series inductance and shunt capacitance, the idealized voltage curves in FIGURES 14A and 14B are not realized and the voltage has lesser maximum amplitude and does not go completely to zero. However, the resultant voltage derived from diode 36 is a D.C. voltage whose amplitude is proportional to the incident RF energy and which is chopped at a frequency dependent upon the excitation of diode 35. Diodes 35 and 36 should be ideally spaced a quarter wave length apart along the longitudinal axis of the wave guide and may be spaced a quarter wave length and a half wave length respectively from the effective end of the guide as illustrated in the drawing.

Figures 15, 16:
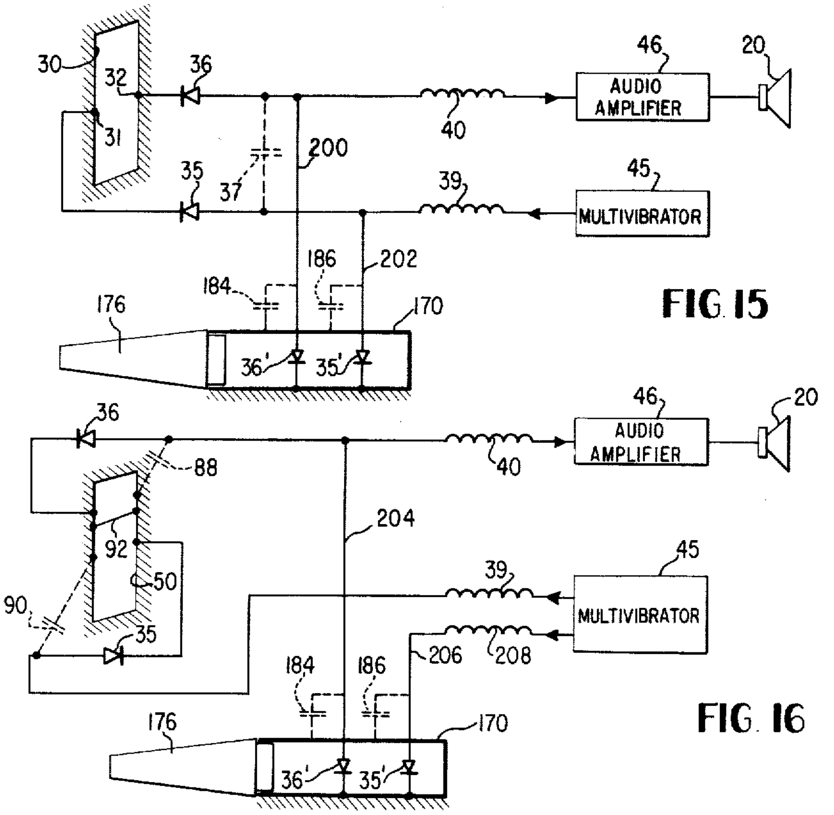
FIGURE 15 shows a circuit diagram of a two band detector combining the features of the embodiments of FIGURES 3 and 14.
FIGURE 16 shows a circuit diagram of a two band detector combining the features of the embodiments of FIGURES 8 and 14.

FIGURE 15 illustrates a simplified circuit diagram for a two band signal checker combining the features of the slot antenna system of FIGURE 3 and the wave guide antenna system of FIGURE 14. In this embodiment diodes 35 and 36 are connected in the manner shown in FIGURES 1–3 so that energy impinging upon slot 30 of a lower microwave frequency, i.e., S band frequency, produces an audible tone in speaker 20. Similarly high frequency energy, i.e., X band energy, impining on wave guide antenna 170 energizes a pair of similar diodes 35' and 36' to also produce an audible tone in speaker 20. A pair of leads 200 and 202 connect the two antenna and detector input systems in parallel through the choke coils 39 and 40 to the multivibrator and audio amplifier.

FIGURE 16 shows a further modified two band embodiment combining the features of the input circuits of FIGURES 8 and 14 respectively. S band frequency energy incident on slot antenna 50 produces an audible output in speaker 20. Similarly incident X band energy on wave guide antenna 170 produces an audible output in the speaker. The antenna and diode input circuits are connected in parallel by means of a pair of leads 204 and 206. However, the lead 206 connects diode 35' through a third choke coil 208. Coil 208 is connected to the opposite side of the multivibrator from coil 39 so as to provide a like polarity signal to the audio amplifier from both antenna systems. Since the voltage through diode 36 for S band reception is a maximum when the diode 35 is non-conducting whereas the voltage through diode 36' for X band reception is a maximum when diode 35' is conducting, diodes 35 and 35' are connected to opposite sides of multivibrator 45 so as to produce the same polarity input to the audio amplifier 46 irrespective of whether the reception is of the S band of antenna 50 or the X band on wave guide antenna 170. In this case X band reception by antenna 50 is undesirable and the positions of the diodes 35 and 36 are chosen so that X band reception via antenna 50 is minimized and does not interfere with the reception of X band energy from the wave guide antenna 170.

Figure 17:
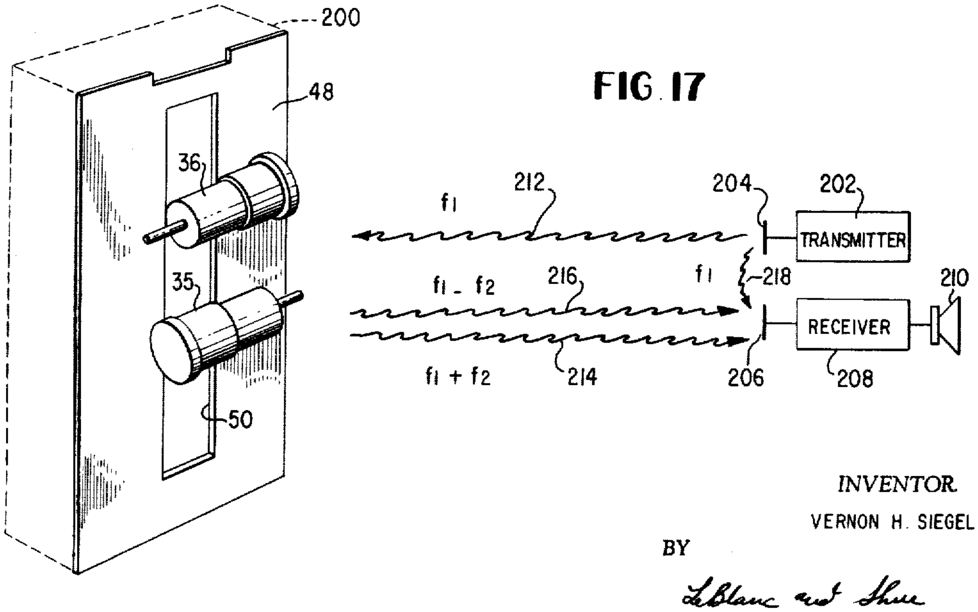
FIGURE 17 shows a counter detection system constructed in accordance with the present invention.

FIGURE 17 shows a counter detection system constructed in accordance with the present invention. FIGURE 17 illustrates a detector 200 in dashed lines constructed in the manner of FIGURES 4–8 having antenna plate 48 and slot 50 upon which are mounted the diodes 35 and 36. While illustrated in conjunction with a microwave checker of FIGURES 4–8, it is understood that the detection system of FIGURE 17 may be used in conjunction with any of the previously described embodiments.

In the system of FIGURE 17 a transmitter 202 sends energy by way of antenna 204 of a frequency $f_1$ to detector 200. Due to interaction in the detector, sum and difference frequency signals are radiated from the detector and impinge on antenna 206 of a receiver 208 connected to a suitable indicator such as a speaker 210. A portion of the microwave energy radiated by antenna 204 also impinges on receiving antenna 206.

The counter detection system of FIGURE 17 is based on the fact that in each of the checker embodiments described there is an antenna with two diodes mounted so that they connect across the antenna terminals. In the respective embodiments, one diode, i.e., diode 35, is alternately turned on and off at an audio rate. The effect of this diode is to alternately short the antenna terminals so that if RF energy is present on the antenna then the RF energy applied to the other diode, i.e., diode 36, is modulated and the output from diode 36 is varied in amplitude so that an audio signal is available instead of a D.C. signal.

However, in each of the checker systems the diode 35 is in the presence of the RF signals. During the time the diode 35 is turned on RF energy flows through this diode and since the diode is a non-linear element a mixing of the RF signal and the audio signal results. This produces two other frequencies in addition to the RF frequancy and the audio frequency in a well-known manner, one of the other frequency signals being the sum of the RF and AF signals and the other being the difference between the RF and AF signals.

In FIGURE 17 the impinging signal 212 having a frequency $f_1$ produces in the mixer diode 35 the sum and difference frequency signals 214 and 216 which are radiated by the antenna back to the source of the orginal signal 212. In the receiver one of the signals 214 or 216 is beat against the direct signal 218 from antenna 204 to produce an audio output in speaker 210. It is apparent that the counter detection system of FIGURE 17 makes it possible for the operator of the transmitter 202 to have an indication in his receiver 208 any time that a detector is detecting the signal from his transmitter.

The system of FIGURE 17 is particularly suited for use in conjunction with police speed radar and makes it possible for the policeman to know when a detector in an approaching car is detecting his signal. The system of FIGURE 17 is also extremely useful in conjunction with military radar particularly the type known as personnel surveillance radar. For example, surveillance radar often in the form of a doppler type radar is used to detect the presence of enemy vehicles and/or personnel. It is a more or less common expedient to avoid being detected by such radar by simply standing still and remaining immobile so that no velocity caused difference frequency is produced. With the system of FIGURE 17 it is possible for the surveillance radar operator to have an indication of the presence of an immoble enemy detecting his signal even though no velocity caused difference frequency is produced since the detector itself produces a difference frequency which can be indicated at the receiver.

It is apparent from the above that the present invention provides a novel microwave detector and counter detection system of relatively simple, inexpensive construction having increased sensitivity. It is apparent that the detector may be used for detecting both continuous and modulated signals from a variety of inputs over a wide frequency range. Through the use of the novel circuits of the present invention it is possible to detect extremely high frequencies through the use of a regenerative circuit having an extremely low or audio frequency output. Also provided is a simplified detector for detecting signals in a plurality of frequency bands.

This application is a continuation in part of copending application Serial No. 117,111 filed June 14, 1961.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for indicating the presence of electrical energy comprising an antenna, a detector including a series diode and shunt capacitance connected to receive electrical energy from said antenna, a modulator diode coupled in series with said detector diode across the opposite sides of said antenna with the electrical energy applied to said detector diode from said antenna passing through said modulator diode, means for rendering said modulator diode alternatively conductive and non-conductive, an amplifier coupled across said capacitance, and indicating means coupled to the output of said amplifier.

2. An apparatus for indicating the presence of electromagnetic radiation comprising antenna means for intercepting radiated energy, a pair of diodes having first electrodes coupled respectively to opposite sides of said antenna means, the second electrodes of said pair of diodes being disposed in proximate physically spaced relation to one another thus forming a capacitance therebetween, means for rendering one of said diodes alternately conductive and non-conductive so as to chop any radiation intercepted by said antenna with the other of said diodes rectifying said chopped radiation to produce an alternating voltage across said capacitance, and means for indicting the occurrence of said alternating voltage across said capacitance.

3. The apparatus of claim 2 wherein a dielectric material is physically interposed between said second electrodes of said diodes.

4. The apparatus of claim 2 wherein said indicating means comprises means producing an audible output.

5. An apparatus for indicating the presence of electromagnetic radiation comprising a housing, an antenna adapted to intercept radiated energy, a pair of semiconductor diodes within said housing having like first electrodes coupled respectively to opposite sides of said antenna, the like second electrodes of said pair of diodes being physically spaced from one another with a dielectric therebetween thus defining a capacitance whereby relatively high frequency energy intercepted by said antenna circulates in a closed loop path between opposite sides of said antenna via said pair of diodes and said capacitance, switching means for rendering one of said diodes alternately conductive and non-conductive at a relatively low repetition rate so as to chop said circulating current and develop a relatively low frequency alternating voltage across said capacitance, indicating means, and means including frequency responsive impedance means for transferring said relatively low frequency alternating voltage to said indicating means while simultaneously impeding transfer of said relatively high frequency energy to said indicating means.

6. The apparatus of claim 5 wherein said dielectric comprises a sheet of plastic material.

7. A microwave receiver comprising a housing having at least one conductive wall defining an elongated slot proportioned to operate as a microwave antenna, first and second semiconductor diodes disposed within said housing adjacent said slot, the cathode terminals of said diodes being electrically connected respectively to spaced points on said housing wall adjacent opposite sides of said slot, the anode terminals of said diodes being disposed in adjacent physically spaced relation to one another to define a capacitance therebetween, local oscillator means in said housing, the spacing between said diode anode terminals being such that said capacitance exhibits a low impedance to microwave signals received at said slot and exhibits a substantially higher impedance to signals at the frequency of said local oscillator, means coupling said local oscillator to one of said diodes for chopping received microwave signals whereby the other of said diodes operates as a demodulator for said chopped microwave signals to produce a control signal across said capacitance, and indicator means carried by said housing and responsive to the presence of said control signal across said capacitance for indicating the presence of microwave signals at said slot.

8. The apparatus of claim 7 wherein said cathode terminals are connected to said housing wall by conductive straps comprising series inductances at the frequency of said microwave signals effecting an impedance match to said slot antenna.

9. An input circuit for an electromagnetic radiation detector comprising a planar plate of conductive material having an elongated slot formed therein and proportioned to operate as a microwave antenna, first and second semiconductor diodes disposed substantially in alignment with one another and substantially parallel to the plane of said plate, the cathode terminals of said diodes being remote from one another and being connected respectively to spaced points on said plate adjacent opposite sides of said slot, the anode terminals of said diodes being disposed in adjacent physically spaced relation to one another to define a capacitance therebetween, and choke means coupled to the anode terminals of at least one of said diodes for transferring signals out of said input circuit.

10. The circuit of claim 9 wherein said spaced anode terminals are disposed adjacent an open portion of said slot.

11. An electromagnetic radiation detector comprising: an antenna for intercepting radiation; a first diode operating as a modulator and having a first electrode thereof connected to said antenna; a second diode operating as a demodulator and having a like first electrode thereof connected to said antenna at a point spaced from the point of connection thereto of said first diode; a local oscillator operating at a frequency substantially lower than that of said intercepted radiation; first reactive impedance means between the like second electrode of said first and second diodes, said first impedance means having a relatively low impedance magnitude at the frequency of said intercepted radiation and having a substantially higher impedance magnitude at the frequency of said local oscillator; second reactive impedance means coupling the output of said local oscillator to the second electrode of said modulator diode for rendering said modulator diode alternately conductive and non-conductive thereby to chop intercepted radiation circulating between said spaced antenna points via said diodes and said first reactive impedance means at the frequency of said local oscillator, whereby said demodulator diode produces a signal at the frequency of said local oscillator across said first reactive impedance means in response to interception of radiation by said antenna; an amplifier; third reactive impedance means coupling said demodulator diode signal to said amplifier; said second and third impedance means each having a relatively high impedance magnitude at the frequency of said intercepted radiation for inhibiting passage of signals at said intercepted frequency to said local oscillator and to said amplifier; and output indicator means coupled to the output of said amplifier for indicating the interception of radiation by said antenna.

12. An electromagnetic radiation detector comprising a slot antenna for intercepting microwave radiation, a modulator diode having a first electrode thereof connected to one side of said slot, a demodulator diode having a like first electrode thereof connected to said slot antenna at a point on the other side thereof, a local oscillator operating at a frequency substantially lower than that of said microwave radiation, reactive impedance means between the like second electrodes of both diodes, said impedance means having a relatively low impedance magnitude at the frequency of said intercepted microwave radiation and having a substantially higher impedance magnitude at the frequency of said local oscillator, and means coupling the output of said local oscillator to said modulator diode for rendering said modulator diode alternately conductive and non-conductive thereby to chop intercepted microwave radiation circulating between said spaced antenna points via said diodes and said reactive impedance means at the frequency of said local oscillator, whereby said demodulator diode produces a signal at the frequency of said local oscillator across said reactive impedance means in response to interception of microwave radiation by said antenna.

13. A detecting apparatus comprising an antenna for intercepting radiation, a first diode operating as a switch and having a first electrode thereof connected to one side of said antenna, a second diode operating as a signal demodulator and having a like first electrode thereof connected to the opposite side of said antenna, impedance means interconnecting the like second electrodes of said first and second diodes, a local oscillator, and means coupling the output of said local oscillator to said switch diode for rendering said switch diode alternately conductive and non-conductive thereby to chop intercepted radiation circulating between said spaced antenna points via said diodes and said impedance means at the frequency of said local oscillator, whereby said demodulator diode produces a signal at the frequency of said local oscillator across said impedance means in response to interception of radiation by said antenna.

14. An electromagnetic radiation detector apparatus comprising, an input circuit including an antenna for intercepting high frequency radiation; an amplifier coupled to said input circuit; output indicator means coupled to the output of said amplifier for indicating interception of radiation by said antenna; and means in said apparatus for providing to the input circuit oscillations at a frequency substantially lower than that of said intercepted radiation; said input circuit including: a first diode operating as a modulator and having a first electrode thereof connected to said antenna; a second diode operating as a demodulator and having a first electrode thereof connected to said antenna at a point spaced from the point of connection thereto of said first diode; a first reactive impedance means between the second electrodes of said first and second diodes, said first impedance means having a relatively low impedance magnitude at the high frequency of said intercepted radiation and having a substantially higher impedance magnitude at the lower frequency of said oscillation providing means; second reactive impedance means coupling said lower frequency oscillations providing means to the second electrode of said modulator diode for rendering said modulator diode alternately conductive and non-conductive thereby to chop intercepted radiation circulating between said spaced antenna points via said diodes and said first reactive impedance means at the lower frequency of said oscillation providing means, whereby said demodulator diode produces a signal at the lower frequency of said oscillation providing means across said first reactive impedance means in response to interception of radiation by said antenna; and third reactive impedance means coupling said demodulator diode signal to said amplifier; said second and third impedance means each having a relatively high impedance magnitude at the frequency of said intercepted radiation for inhibiting passage of signals at said intercepted frequency to said oscillation providing means and to said amplifier.

15. An input circuit for an electromagnetic radiation detector comprising a planar plate of conductive material having an elongated slot formed therein and proportioned to operate as a microwave antenna, first and second semiconductor diodes secured to a surface of said plate and extending across said slot, one end of each of said diodes being electrically connected to said plate, dielectric means spacing the other ends of said diodes from adjacent surfaces of said plate to form distributed capacitances therebetween, said slot being tuned to a lower band of frequencies and one of said diodes being positioned approximately midway of the ends of said slot to tune said slot to a higher band of frequencies, and choke means coupled to said other end of the other of said diodes for transferring signals out of said input circuit.

16. A microwave receiver comprising a housing having at least one conductive wall defining an elongated slot proportioned to operate as a microwave antenna, first and second semiconductor diodes secured to the outer surface of said wall and extending across said slot, the cathode terminals of said diodes being electrically connected to spaced points on said housing wall adjacent opposite sides of said slot, dielectric means spacing the anode terminals of said diodes from adjacent surfaces of said plate to form distributed capacitances therebetween, local oscillator means in said housing, means coupling said local oscillator means to one of said diodes for chopping received microwave signals whereby the other of said diodes operates as a demodulator for said chopped microwave signals to produce a control signal across the capacitance between its anode and said plate, and indicator means carried by said housing and responsive to the presence of said control signal across said capacitance for indicating the presence of microwave signals at said slot.

17. The receiver of claim 16 wherein said slot is tuned to a lower band of microwave frequencies, and said modulator diode when conducting effectively tunes a portion of said slot to a higher band of microwave frequencies.

18. The receiver of claim 17 wherein said modulator diode is positioned at a voltage maximum along said slot for said lower band, said demodulator diode being positioned across said slot at a point where the voltage is other than zero for both said bands.

19. Signal detecting apparatus comprising a microwave antenna having a pair of output terminals, a detector diode, a capacitance and a modulator diode all connected in series between said terminals, a microwave choke connecting one side of said capacitance to the input of a tuned audio amplifier, indicating means coupled to the output of said amplifier, and a regenerative feedback path including a microwave choke coupling a signal from said amplifier to the other side of said capacitance, the loop gain provided by said feedback path being sufficient to establish oscillations in said amplifier only when microwave energy is received by said detector diode.

20. Apparatus according to claim 19 wherein said feedback path includes a rectifier for feeding back a signal having an average value other than zero.

21. Apparatus according to claim 20 wherein said feedback path includes a diode.

22. Apparatus according to claim 20 wherein said feedback path is from the last stage of said amplifier, said last stage acting as a rectifier.

23. Apparatus according to claim 22 wherein said amplifier includes a low pass audio filter.

24. An input circuit for an electromagnetic radiation detector comprising a waveguide antenna, first and second semiconductor diodes positioned at spaced points along the longitudinal axis of said waveguide and extending across said waveguide, one terminal of each of said diodes being electrically connected to said waveguide, dielectric means spacing the other terminals of said diodes from adjacent portions of said waveguide to form distributed capacitances therebetween, and choke means coupled to said other terminal of at least one of said diodes for transferring signals out of said input circuit.

25. The input circuit of claim 24 wherein said diodes are spaced approximately a quarter wavelength apart.

26. A microwave receiver comprising a waveguide antenna, first and second semiconductor diodes positioned at spaced points along the longitudinal axis of said waveguide and extending across said waveguide, one terminal of each of said diodes being electrically connected to said waveguide, dielectric means spacing the other terminals of said diodes from adjacent portions of said waveguide to form distributed capacitances therebetween, local oscillator means, means coupling said local oscillator means to one of said diodes for chopping received microwave signals whereby the other of said diodes operates as a demodulator for said chopped microwave signals to produce a control signal across the capacitance between its said other terminal and said waveguide, and indicator means responsive to the presence of said control signal across said capacitance for indicating the presence of microwave signals at said antenna.

27. The receiver of claim 26 wherein said waveguide antenna terminates in a tapered dielectric rod.

28. A multiband microwave receiver comprising a slot antenna, a first demodulator diode and a first modulator diode connected to opposite sides of said slot antenna, a waveguide antenna, a second demodulator diode and a second modulator diode connected approximately a quarter wavelength apart along the longitudinal axis of said waveguide, local oscillator means, means coupling said local oscillator means to both of said modulator diodes for chopping received microwave signals whereby said demodulator diodes produce control signals, and indicator means coupled to both of said demodulator diodes and responsive to the presence of a control signal from either demodulator diode for indicating the presence of microwave signals at the corresponding antenna.

29. The receiver of claim 28 wherein said first modulator and demodulator diodes are connected in series across the opposite sides of said slot antenna.

30. The receiver of claim 28 wherein said first modulator and demodulator diodes are individually connected across said slot antenna at spaced points along its length.

31. A multiband microwave receiver comprising a microwave antenna, a first demodulator diode and a first modulator diode connected to opposite sides of said microwave antenna, a waveguide antenna, a second demodulator diode and a second modulator diode connected approximately a quarter wavelength apart along the longitudinal axis of said waveguide antenna, local oscillator means, means coupling said local oscillator means to both of said modulator diodes for chopping received microwave signals whereby said demodulator diodes produce control signals, and indicator means coupled to both of said demodulator diodes and responsive to the presence of a control signal from either demodulator diode for indicating the presence of microwave signals at the corresponding antenna.

References Cited in the file of this patent

UNITED STATES PATENTS

| | | |
|---|---|---|
| 2,513,811 | Matthews | July 4, 1950 |
| 2,607,004 | Harris | Aug. 12, 1952 |
| 2,901,613 | Patterson et al. | Aug. 25, 1959 |
| 2,903,508 | Hathaway | Sept. 8, 1959 |

FOREIGN PATENTS

| | | |
|---|---|---|
| 676,055 | Germany | May 25, 1939 |

OTHER REFERENCES

Stoner: "Radar Speedometer Receiver," CQ, January 1958, pp. 27, 105 and 107.

Ferrell et al.: "Radar Speed-Trap Detector," Popular Electronics vol. 15, No. 3, Sept. 1961, front cover, pp. 49–52 and 107.

UNITED STATES PATENT OFFICE

CERTIFICATE OF CORRECTION

Patent No. 3,094,663 June 18, 1963

Vernon H. Siegel

It is hereby certified that error appears in the above numbered patent requiring correction and that the said Letters Patent should read as corrected below.

Column 2, line 32, for "of", first occurrence, read -- or --; column 3, line 4, for "ether" read -- either --; line 25, for "adpted" read -- adapted --; column 4, line 11, for "for" read -- the --; column 7, line 26, for "36-6" read -- 35-6 --; column 8, line 10, for "aperatures" read -- apertures --; column 9, line 42, for "longth" read -- length --; column 10, line 44, for "votlage" read -- voltage --; column 12, line 32, for "of", third occurrence, read -- on --; lines 73 and 74, for "frequancy" read -- frequency --; column 13, line 28, for "immoble" read -- immobile --; column 14, line 7, for "indicting" read -- indicating --.

Signed and sealed this 24th day of December 1963.

(SEAL)
Attest:

ERNEST W. SWIDER
Attesting Officer

EDWIN L. REYNOLDS
Acting Commissioner of Patents